June 18, 1957 T. W. PAUL 2,795,919
BEET TOPPING DRIVE MEANS
Original Filed May 29, 1952 4 Sheets-Sheet 4
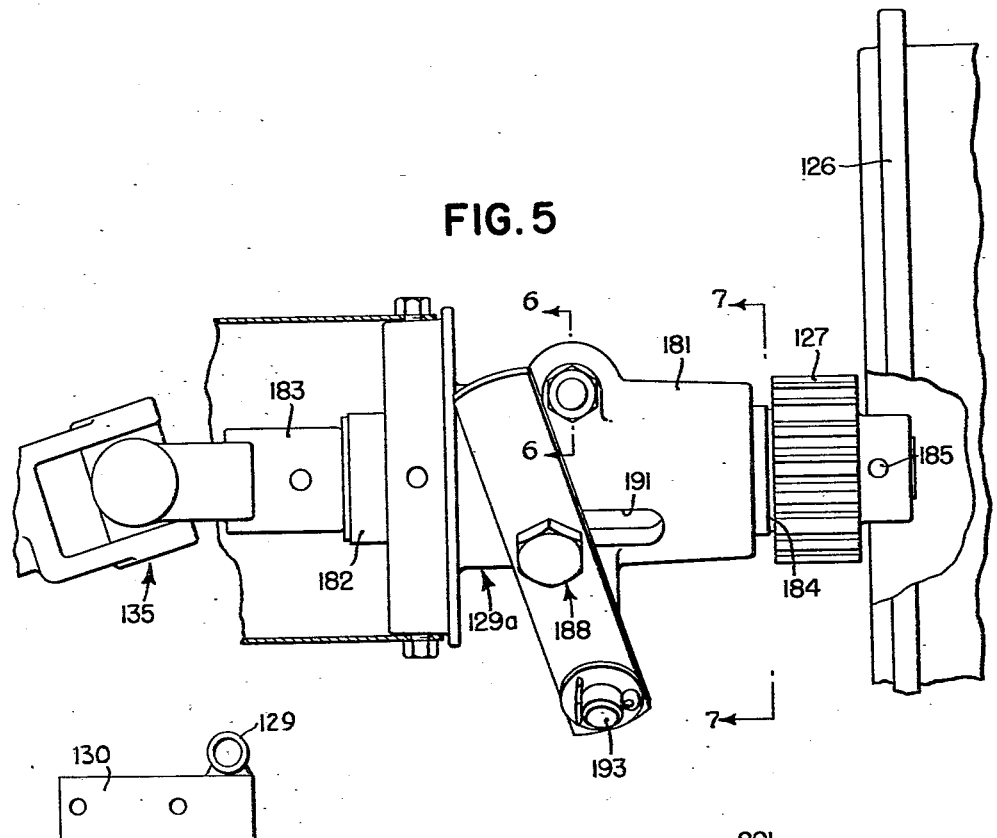
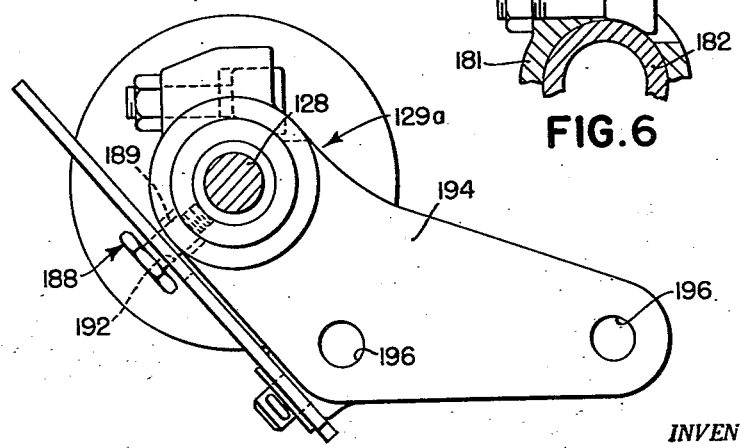
INVENTOR
TALBERT W. PAUL
BY
ATTORNEYS the像 # United States Patent Office 2,795,919
Patented June 18, 1957

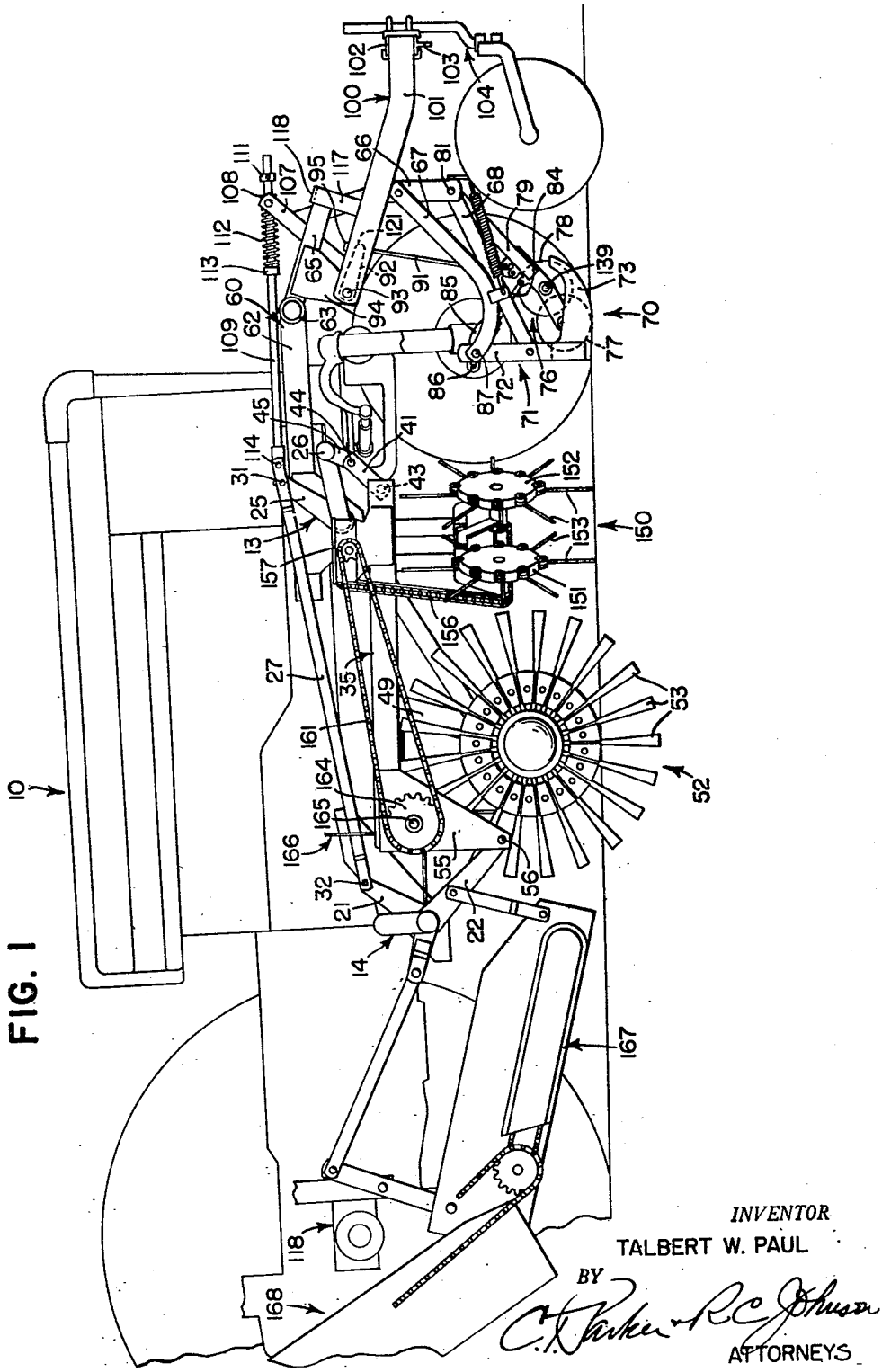

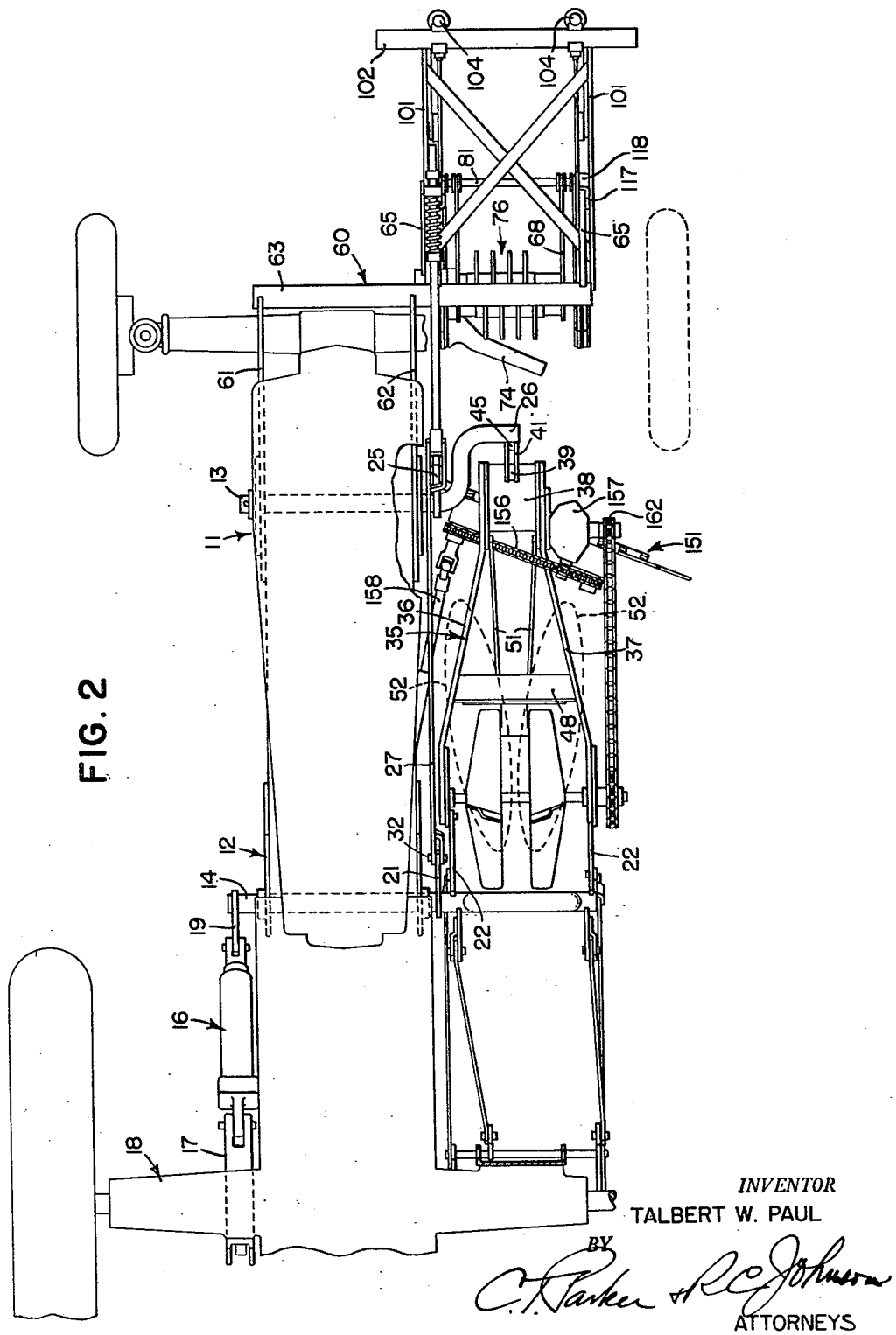

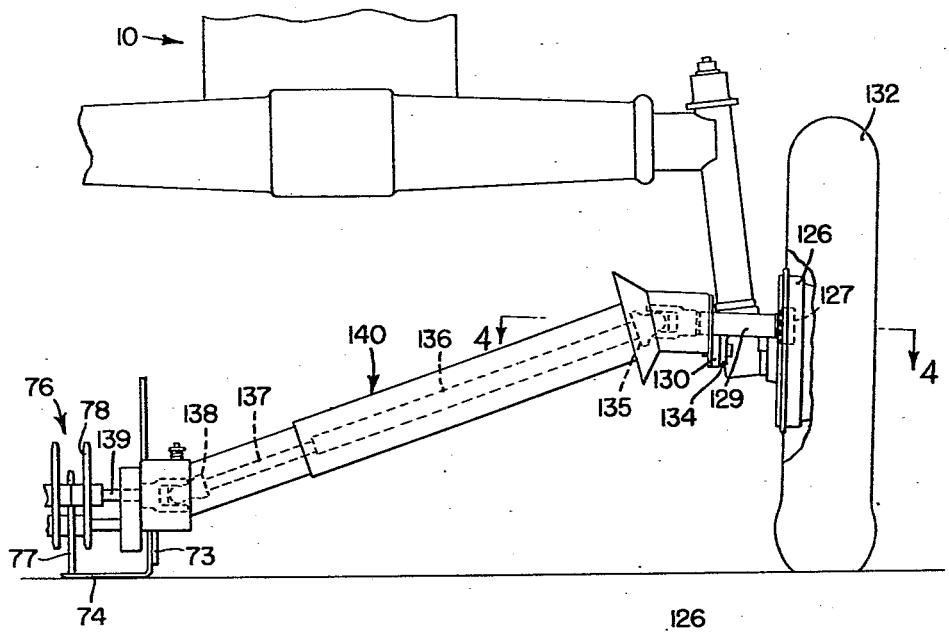
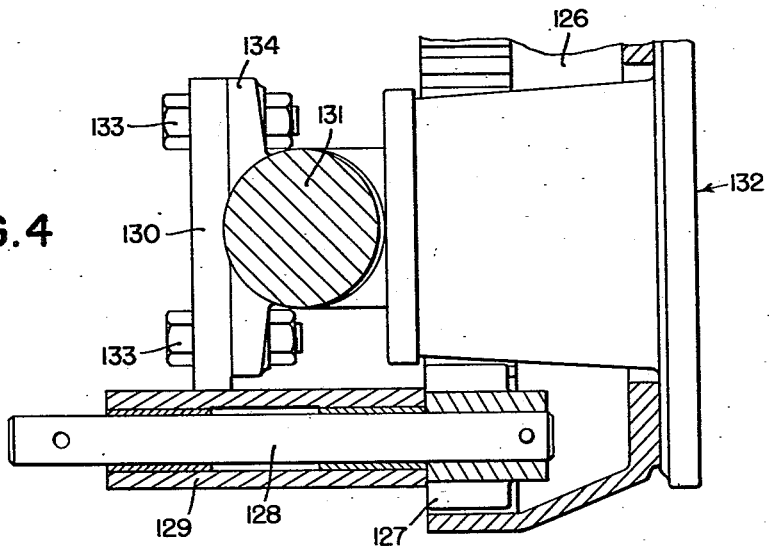

2,795,919
BEET TOPPING DRIVE MEANS

Talbert W. Paul, Moline, Ill., assignor to Deere & Company, Moline, Ill., a corporation of Illinois Original application May 29, 1952, Serial No. 290,753, now Patent No. 2,751,739, dated June 26, 1956. Divided and this application June 7, 1954, Serial No. 435,013

9 Claims. (Cl. 56—121.4)

This application is a division of my copending application, Serial No. 290,753, filed May 29, 1952, now Patent 2,751,739, for Beet Harvester.

The present invention relates generally to agricultural machines and more particularly to beet harvesters and the like.

The object and general nature of the present invention is the provision of a beet harvester having beet-topping means, driven finder wheel means therefor and new and improved means for driving said finder wheel means from a ground wheel, such as one of the wheels of the tractor. In this way, the finder wheel means will always be driven at the proper rate because the latter is directly determined by the speed of ground travel.

These and other objects and advantages of the present invention will be apparent to those skilled in the art after a consideration of the following detailed description, taken in conjunction with the accompanying drawings, in which Figure 1 is a side view of a portion of a beet harvester in which the principles of the present invention have been incorporated.

Figure 2 is a plan view of the principal portion of the harvester shown in Figure 1.

Figure 3 is a front end view of the harvester, certain parts being omitted, showing the drive for the finder wheel unit of the harvester.

Figure 4 is a detail view, being partially a section taken an the line 4—4 of Figure 3 and made on an enlarged scale, with parts broken away, showing the preferred means for connecting the finder wheel drive mechanism with the left-hand front wheel of the tractor.

Figure 5 is an enlarged fragmentary view, with certain parts in section, showing clutch mechanism adapted for use with the drive means shown in Figures 3 and 4.

Figure 6 is a fragmentary sectional view, with certain parts in section, taken along the line 6—6 of Figure 5, with certain parts broken away.

Figure 7 is a sectional view taken along the line 7—7 of Figure 5.

Figure 8 is a detail view showing in elevation the shaft-supporting means for the front wheel driven shaft that drives the finder wheel units.

The beet harvester in which the principles of the present invention have been incorporated is adapted to be mounted on a tractor 10 which is of conventional construction so far as the present invention is concerned. The frame of the tractor 10 carries suitable means, preferably power operated, a portion of which is indicated at 13, by which beet-digging and top-handling mechanism are supported. A portion of the top-handling means is indicated at 150. The supporting means for the beet-digging and top-handling mechanism also includes a subframe 35 and means for raising and lowering the latter.

Carried by the front of the tractor ahead of the beet-digging and top-handling mechanism is a beet-topping unit, described below, and the beet-topping unit is carried by a supporting structure 60 that is fixed to the forward portion of the tractor and comprises right- and left-hand, generally fore-and-aft extending bars 61 and 62, the forward ends of which carry a cross member 63 in the form of a pipe or tube, the right end of which extends outwardly and lies in front of the subframe 35, as best shown in Figure 2. A pair of downwardly and forwardly extending brackets 65 are fixed to the right-hand portion of the cross pipe 63 and have downward extensions 66 that pivotally receive pairs of upper and lower link members 67 and 68 by which a topping unit 70 is swingably connected with the tractor-supported framework.

The topping unit per se is largely conventional, so far as the present invention is concerned, the topping unit comprising a vertical frame 71 comprising upright bars 72 suitably interconnected by bracing or the like and at their lower ends carrying ground-engaging sled runner sections 73, to one of which a topping knife 74 is fixed. The topping 70 also includes a finder wheel unit 76 and this unit comprises two sections 77 and 78 of finder wheels suitably connected to rotate together, substantially like the finder wheel construction shown in U. S. Patent 2,433,799, which issued December 30, 1947 to Walz et al., and carried by suitable bearing means at the lower ends of a pair of finder wheel frame bars 79, the upper ends of which are pivotally connected to swing on a cross shaft 81 which forms a pivotal connection between the forward ends of the lower links 68 and the tractor- carried supporting brackets 65. The movement of the finder wheel frame bars 79 and the finder wheel unit 76 relative to the knife frame 71 is limited by a pair of brace links 84, the upper and rear ends of which carry castings 85 having slots 86 receiving pins 87 that are fixed to the upper ends of the vertical knife frame bars 72.

The topping knife unit 70 and the finder wheel unit 76 are raised and lowered into the out of operating position when the beet-digging and top-handling mechanism is raised and lowered. This is accomplished by means of a vertical rod 91 suitably connected at its lower end with the finder frame bars 79 and at its upper end with an arm 92 that is fixed to a cross shaft 93 rockably mounted in a pair of depending brackets 94 that form a part of the supporting structure 65 which is rigidly fixed to the front portion of the tractor. Preferably, the arm 92 carries a swivel 121 that is apertured and loosely receives the upper end of the rod 91, the upper end having a head 95 that limits the downward movement of the rod 91 relative to the arms 92 but permits upward movement of the rod relative to the arm. The lower end of the rod 91 is pivotally connected with the finder wheel frame bars 79.

According to the principles of the present invention, the finder wheels 77 and 78 are driven by a simple direct connection to any suitable ground wheel, such as, for example, one of the front wheels of the tractor, as is illustrated in Figure 3. To this end, the left-hand front wheel of the tractor is provided with a driving gear 126 which meshes with a pinion 127 fixed to a short shaft 128 that is journaled for rotation in a housing 129 fixed to the associated spindle 131 upon which the left-hand front tractor wheel, indicated at 132, is journaled for rotation. Preferably, as shown in Figure 4, a generally fore-and-aft extending bar 130 carrying the housing 129 is fixed by bolts 133 to an apertured pad or lug means 134 that forms a part of the lower portion of the spindle 131, as shown in Figure 3. A universal joint 135 connects the inner end of the shaft 128 with a pair of telescopically associated shaft sections 136 and 137, and a universal unit 138 connects the inner end of the latter section with a shaft 139 that is connected to drive the two sets of finder wheels. Preferably, suitable shield means, indicated generally at 140, is provided to protect the rotating shaft sections and associated universals and other parts from contact with weeds, tops and other material which might otherwise wrap around the shaft means and/or its universal joints.

The form of finder wheel drive means just described and shown in Figures 3 and 4 provides for driving the finder wheel unit 76 by a direct connection with the left-hand front tractor wheel. However, where fields are far apart, or for other reasons, it may be desirable to provide means for interrupting the drive between the front wheel of the tractor and the finder wheel unit whenever the outfit is to be transported any appreciable distance. Accordingly, referring to Figures 5–7, the present invention contemplates a simple hand-operated, drive-interrupting mechanism which will now be described.

In this form of the invention the stub shaft housing 129a is provided with a generally cylindrical section 181 in which a sleeve 182 surrounds the stub shaft 128 and rotatably receives the latter. The sleeve 182 is held against axial displacement relative to the shaft 128 by one of the yokes 183 making up the universal joint 135, and a thrust collar 184 lying against the pinion 127, which may be fixed to the outer end of the shaft 128 by any suitable means, such as a pin 185. The sleeve 182 does not rotate in the housing 181. Instead, the inner end of a stud bolt 188 is threaded into a tapped opening into the sleeve 182 and, when tightened, bears against the shaft 128. The outer portion 189 of the stud bolt 188 is generally cylindrical and is disposed for axial movement in a slot 191 formed in the casing 181. The cylindrical portion 189 of the stud bolt 188 receives and passes through an opening 192 formed in a hand lever 193, the lower end of which is pivotally connected to a projection 193 carried on an extension 194 of the housing 181, the extension 194 being apertured, as at 196, to receive suitable attaching means, such as bolts 197 (Figure 4) extending through the apertures 196 and through aligned apertures in attaching pads 198 (Figures 3 and 4) carried at the lower end of the spindle 131. Since the stud bolt 189 is fixed to the sleeve 182 and is slidable in the slot 191, swinging the hand lever 193, as from its left-hand position, Figure 5, into a right-hand position, serves to shift both the sleeve 182 and the shaft 128 to the right (Figure 5) carrying with it the pinion 127 and causing the latter to engage the gear 126 on the left-hand front tractor wheel, thereby establishing a drive between the left-hand tractor wheel and the finder wheel unit 76.

In order to insure that the pinion 127 will be maintained in driving relation at all times that it is desired to drive the finder wheel unit 76, I provide a clamping bolt 201 having a wedge-shaped head 202 disposed within a recess 203 of the housing 181. As best shown in Figure 6, the threaded end of the bolt 201 carries a nut 204, and when the latter is tightened the wedge or clamping head 202 is caused to tightly engage the sleeve 182, thus holding the latter against any axially directed displacement. By loosening the nut 204, the shaft 128 is freed for movement, and may be moved, as desired, by swinging the hand lever 193.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a tractor having means to be driven, a steering spindle turnable about a generally vertical axis, and a ground wheel journaled on said spindle and turnable therewith, the improvement comprising power take-off means adapted to derive power from the rotation of said steerable wheel, said power take-off means including a shaft housing, means connecting said housing to said spindle so to move with the latter during the steering of the tractor, a shaft rotatably disposed in said housing and extending outwardly of the ends of the housing, drive means connected to be actuated by said ground wheel and connected with the adjacent end of the shaft, and means connected with the end of said shaft and said means to be driven for driving the latter, said connecting means including a universal joint means connected with said other end of said shaft.

2. The invention set forth in claim 1, further characterized by said drive means comprising a gear fixed directly to said ground wheel and a pinion fixed to said adjacent end of said shaft and meshing with said gear.

3. The invention set forth in claim 2, further characterized by said shaft being mounted for endwise movement in said shaft housing so as to carry said pinion into and out of driving relation with respect to said wheel-carried gear.

4. The invention set forth in claim 3, further characterized by a sleeve in which said shaft is journaled, a housing slidably supporting said sleeve, and means fixing said sleeve in two different axially spaced apart positions, to provide for shifting said pinion into and out of mesh with said gear.

5. The invention set forth in claim 4, further characterized by a slot in said housing, a pin extending through said slot and fixed to said sleeve, and a lever pivoted to said housing and connected to said pin.

6. The invention set forth in claim 4, further characterized by a locking member carried by said housing and releasably engageable with said sleeve in different positions of the latter.

7. In a tractor and implement combination, the tractor having dirigible wheel means including a steerable wheel and a generally vertical turnable spindle on which said wheel is journaled, the improvement comprising attachment lug means on the lower end of said spindle, a transverse shaft housing, a generally fore-and-aft extending part fixed to said lug means and to said shaft housing, whereby the latter is carried by and turns with the steering spindle, drive means connecting the steerable wheel with the adjacent end of said shaft, a universal joint connected to the other end of said shaft, and telescopic shaft means connected with said universal joint, the latter and said telescopic shaft means accommodating turning of said spindle, as in steering the tractor.

8. In a tractor and implement combination, wherein the implement includes means to be driven and mounted for raising and lowering movements relative to the ground, and wherein the tractor includes a steerable wheel and a generally vertical turnable spindle on which said wheel is journaled, the improvement comprising attachment lug means on the lower end of said spindle, a transverse shaft housing, a generally fore-and-aft extending part fixed to said lug means and to said shaft housing, whereby the latter is carried by and turns with the steering spindle, drive means connecting the steerable wheel with the adjacent end of said shaft, a universal joint connected to the other end of said shaft, telescopic shaft means connected with said universal joint, and means to connect the telescopic shaft means to said implement driven means, said universal joint means and said telescopic shaft means accommodating turning of said spindle, as in steering the tractor, and the raising and lowering of said implement means.

9. The combination with a tractor having a front dirigible wheel, including a generally vertically disposed spindle on the lower end of which said wheel is journaled, of a housing fixed to said spindle, a shaft mounted for rotation in said housing, means connecting one end of said shaft with means to be driven thereby, and means carried by said dirigible wheel and said shaft for driving the latter from said tractor dirigible wheel in any position of the spindle thereof.

References Cited in the file of this patent

UNITED STATES PATENTS 2,139,802    Catchpole ------------ Dec. 13, 1938

FOREIGN PATENTS 616,196    Great Britain ------------ Jan. 18, 1949